Aug. 7, 1956 A. R. SOFFEL 2,757,538
FLOWMETER SIGNAL-BALANCING MEANS
Filed April 21, 1952

INVENTOR.
ARTHUR R. SOFFEL
BY Mitchell & Bechert
ATTORNEYS

United States Patent Office 2,757,538
Patented Aug. 7, 1956

2,757,538
FLOWMETER SIGNAL-BALANCING MEANS

Arthur R. Soffel, Ridgewood, N. J., assignor to Vitro Corporation of America, New York, N. Y., a corporation of Delaware Application April 21, 1952, Serial No. 283,328

7 Claims. (Cl. 73—194)

My invention relates to magnetic-induction flowmeters of the type in which flow is measured by observing the voltage induced across the flow passage in the presence of a magnetic field.

In flowmeters of the character indicated, the voltages which must be detected are of relatively low magnitude, and detection may be subject to spurious voltages and various elusive effects. In particular, the flow-induced voltages are sensitive to fluctuations in magnet-excitation voltage.

It is, accordingly, an object of the invention to provide an improved flowmeter of the character indicated.

It is another object to provide a means for substantially reducing flowmeter sensitivity to fluctuations in magnet-excitation voltage.

It is a specific object to meet the above objects with a relatively simple construction in which the output of the flowmeter signal processing circuitry may truly reflect the flow, regardless of such variations in flow-induced voltage as may be attributable to fluctuations in magnet-excitation voltage.

Other objects and various further features of novelty and invention will be pointed out or will occur to those skilled in the art from a reading of the following specification, in conjunction with the accompanying drawings. In said drawings, which show for illustrative purposes only, preferred forms of the invention:

Briefly stated, my invention contemplates means for correcting the flow-induced voltage in a flowmeter by employment of a comparator which shall be responsive not only to the flow-induced voltage, but also to a voltage which directly reflects the magnet-excitation voltage and which may, therefore, be termed a "reference voltage" for purposes of interpreting the operation of the comparator means. In the forms to be described, the reference-voltage is derived from magnet-excitation energy, as from auxiliary or secondary winding means linked to the core of the flowmeter magnet, or from a current-responsive pick off in the magnet-excitation line; and ratio-detecting means provide a means for continuously observing the ratio:

$$\frac{\text{Flow-induced volts}}{\text{Reference volts}}$$

It will be appreciated that this ratio may truly reflect the flow substantially independent of such variations in flow-induced voltage as may be directly attributable to fluctuations in magnet-excitation voltage. The forms to be described show alternative connections for feed-back means to introduce the correcting voltage into the signal-processing circuitry, one form being for the case of an isolation transformer at the input of the amplifier, and the other for the case of a balanced push-pull preamplifier coupling to the amplifier.

Figure 1:
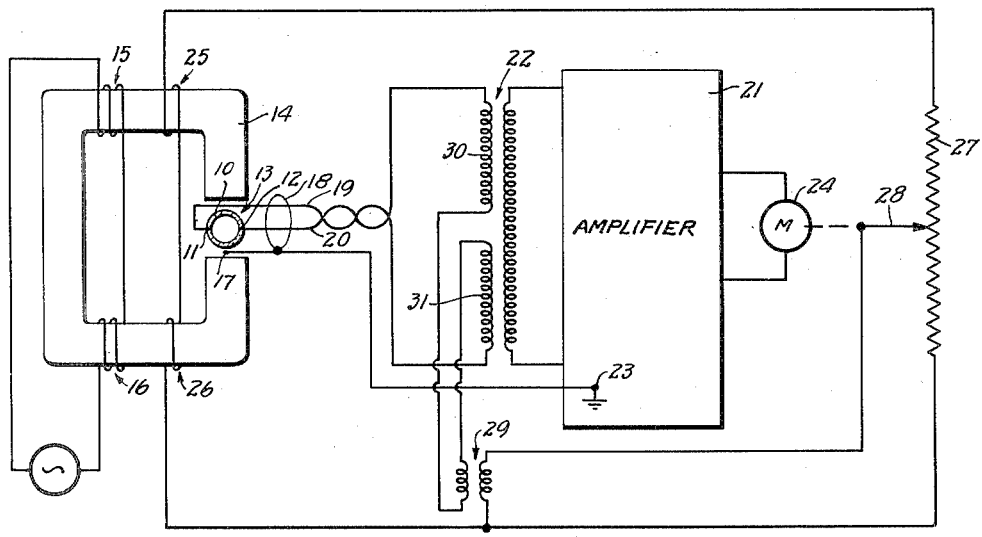
Fig. 1 is an electrical circuit diagram schematically illustrating one form of the invention.

Referring to the drawing, Fig. 1 illustrates an application of the principles of my invention to a flowmeter comprising a flow tube 10, with opposed electrodes 11—12 oriented in and, therefore, spanning a part of the gap 13 on one side of the core 14 of an excitation magnet. The magnet may be excited by primary-winding means, which I have shown to be split into two halves 15—16, connected in series to each other and coupled to parts of the core 14 that are symmetrically located with respect to the gap 13. The primary winding means 15—16 may be excited by alternating current of conventional supply-frequency. In order to minimize the inducement of spurious signals attributable to longitudinal currents in the flow tube, I prefer to ground the flow tube with grounding means schematically shown at 17 but illustrated and described in greater detail in the copending patent application of C. K. Raynsford et al., Serial No. 283,329, filed April 21, 1952.

The grounding means 17 may be connected to the shield 18 of cable means containing insulated leads 19—20, connected to the electrodes 11—12 and for supply of flow-induced voltages to balanced amplifier means 21; it will be understood that amplifier means 21 may include conventional circuitry for phase adjustment, so that phase correlation may be maintained between the flow-induced signal and reference signal. In the present form, I employ transformer means 22 for coupling the electrodes 11—12 to the amplifier means 21. The transformer means 22 is preferably balanced and, therefore, has no grounding connections. The ground potential, represented by that of shield 18, is preferably brought to the neutral point of the balanced amplifier means 21, as suggested by the connection 23.

The apparatus thus far described will operate satisfactorily as a flowmeter, and a recorder, schematically represented at 24 and responsive to the output of amplifier means 21, may record the flow-induced voltages. However, the device is susceptible to fluctuations in magnet-excitation voltage, as supplied to the primary-winding means 15—16.

In accordance with the invention, I provide means for rendering the recorded or other output of amplifier 21 substantially independent of fluctuations in magnet-excitation voltage, as applied at 15—16. Such means may employ a comparator continuously evaluating the flow-induced output as a function of the applied excitation voltage. For this purpose, a ratio-detector may be connected for direct response to the output of electrodes 11—12, and for direct response to the applied line voltage. However, in the preferred form shown, I employ auxiliary or secondary-winding means linked to the magnet core 14 to derive the reference voltage, thus assuring that the "reference" voltage truly reflects instantaneous flux conditions in the core 14. As in the case of the primary-winding means 15—16, I prefer that the auxiliary or secondary-winding means shall be symmetrically split, as into the two windings 25—26, coupled to the core 14 at locations symmetrically placed with respect to the gap 13.

The auxiliary-winding halves 25—26 may be connected in series to each other, and their output may be applied across ratio-detecting means including a voltage-dividing potentiometer 27 with a pick-off arm 28, motor-driven in accordance with the ouput of amplifier means 21. The motor for driving the pick-off means 28 may be the motor of the recorder 24, as suggested by the simplified schematic showing in the drawings.

With the described construction, it will be seen that the pick-off arm 28 will be responsive in position to the flow-induced volts but that its potential will reflect fluctuations in the magnet-excitation voltage, as the latter appears across the potentiometer 27. The voltage thus picked off may be employed as a feed-back to the input of amplifier means 21, and I have shown a symmetrical coupling of the feed-back voltage at the input of the transformer means 22. In order to preserve signal balance, I have provided a balancing transformer 29 in the feed-back line, and have connected the secondary of balancing transformer 29 symmetrically between the center ends of split halves 30—31 of the primary of the transformer 22.

Figure 2:
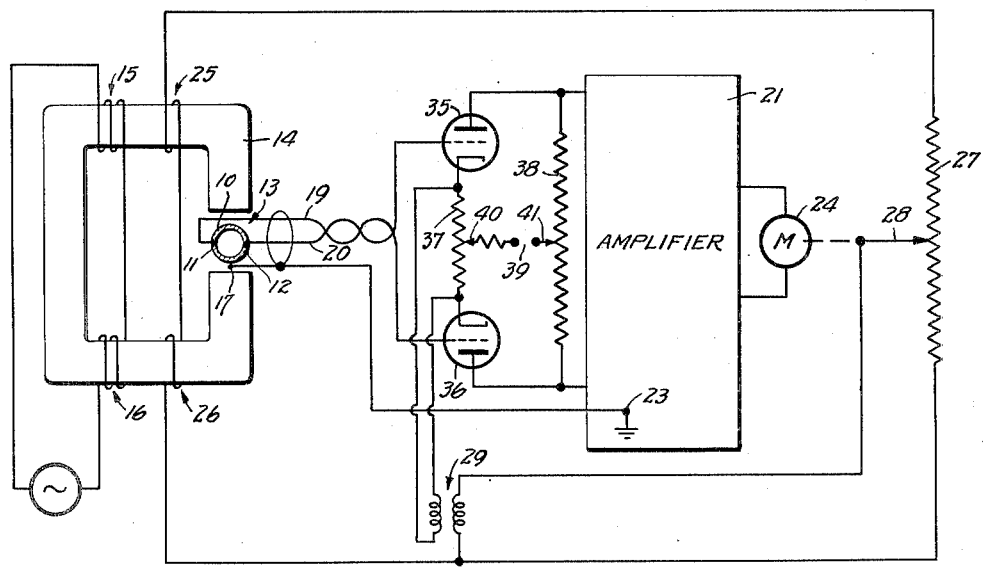
Fig. 2 is a similar diagram illustrating another form of the invention.

In Fig. 2, I show an alternative construction in which the coupling means involves push-pull connected pre-amplifier means 35—36, in place of the transformer (22) of Fig. 1. In the push-pull arrangement of Fig. 2, independence of grounding connections is preserved by connecting the feed-back voltage, as it appears in the output of balancing transformer 29, in balanced relation across an impedance 37 which connects corresponding sides of the inputs to the separate halves 35—36 of the push-pull circuit. The other corresponding sides of the push-pull circuit are shown connected to the respective electrodes 11—12.

In the form shown in Fig. 2, the push-pull amplifiers 35—36 happen to be triodes; and the resistor 37, across which the balanced feed-back voltage is applied, connects the cathodes, while the flow-induced voltage is applied to the grid circuits of these tubes. The output appears across common load-resistor means 38, and a common B-supply may be connected at 39. In order to assure complete balance even in the presence of slight differences in tube characteristics, I prefer that provision be made for adjustment, as suggested at 40 and at 41, in the symmetrical application of the B-supply voltage to resistors 37—38.

Figure 3:
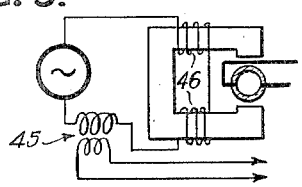
Figs. 3 and 4 are fragmentary views of alternative connections for parts of either of the circuits of Figs. 1 and 2.

In Fig. 3, I illustrate an alternative means for derivation of the reference signal, with assurance that the reference voltage will maintain the desired proportional relationship to the magnet-excitation current. In the form shown, I employ pick-off means such as a transformer 45 having a primary series-connected in the excitation line for magnet winding 46. The desired reference voltage appears across the secondary of transformer 45 and may be applied across the voltage-divider means 27 of either Figs. 1 or 2, thus obviating the need for auxiliary winding means coupled to the magnet core.

Figure 4:
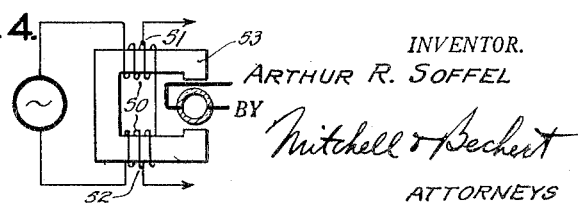

In Fig. 4, I illustrate a further alternative means for derivation of the reference signal, by direct coupling to the winding means which forms part of the magnet-excitation means. The coupling may be made directly to taps 51—52 on the winding means 50 for core 53, and these taps are preferably chosen so as to provide balanced location of the picked-off voltage, with respect to the gap 54, as shown. The reference voltage, available from taps 51—52 may be applied directly across the voltage-divider means 27, as will be understood.

In operation, regardless of which of the above-described forms is employed, the motion of the recorder or of the motor 24, as the case may be, will at all times tend to reflect the true flow function; that is, the ratio of flow-induced volts to reference volts. The device is of simple construction, and, even though the reference voltage is derived from the excitation source, balance of the system may be maintained, independent of external ground potentials, as by employment of the balancing transformer 29 in the feed-back line.

While the invention has been described in detail for the preferred forms shown, it will be understood that modifications may be made within the scope of the invention, as defined in the claims which follow.

I claim:

1. In a flowmeter, magnetic-excitation means including a core with a gap on one side and defining a single magnetic circuit, a flow tube including spaced electrodes spanning a part of said gap, refernce-signal voltage means including a winding inductively coupled to said magnetic-excitation means and electrically independent of said electrodes, and ratio-detecting means including balanced amplifier means with an impedance-matching connection to said electrodes and circuit means including a variable-voltage pick-off connection to said reference-signal voltage means, said variable-voltage pick-off connection including means responsive to the output of said amplifier means for varying the fraction of reference-signal voltage introduced into said circuit means, said impedance-matching means including amplifiers connected in balanced push-pull relation, each of said amplifiers including two-terminal input connections, the output of said electrodes being coupled to first corresponding input-terminal connections of said amplifiers, and said circuit-means connection being made symmetrically to the other corresponding input-terminal connections of said amplifiers.

2. A flowmeter according to claim 1, in which an impedance interconnects said last-mentioned corresponding input-terminal connections of said amplifiers, and in which said circuit means includes a balanced transformer having an output connected symmetrically across said impedance.

3. A flowmeter according to claim 1, in which said winding is inductively coupled to said core.

4. A flowmeter according to claim 1, in which said magnetic-excitation means includes a coil coupled to said core and a transformer having a primary in series with said coil, said winding being the secondary of said transformer.

5. In a flowmeter, magnetic-excitation means including a core with a gap on one side and defining a single magnetic circuit, a flow tube including spaced electrodes spanning a part of said gap, reference-signal voltage means including a winding inductively coupled to said magnetic-excitation means and electrically independent of said electrodes, and ratio-detecting means including balanced amplifier means with an impedance-matching connection to said electrodes and circuit means including a balanced variable-voltage pick-off connection to said reference-signal voltage means, said variable-voltage pick-off connection including means responsive to the output of said amplifier means for varying the fraction of reference-signal voltage introduced into said circuit means, said circuit means including a balanced connection to the input of said amplifier means, whereby the instantaneous voltage proportion picked off by said variable connection may provide a flow indication.

6. A flowmeter according to claim 5, in which said impedance-matching connection includes a transformer having a primary connection to said electrodes and a secondary having a balanced connection to said amplifier means.

7. A flowmeter according to claim 6, in which said primary comprises two like halves, said circuit means including a transformer having a secondary that is series-coupled to said two like primary halves at a location intermediate said halves.

References Cited in the file of this patent

UNITED STATES PATENTS

| 2,607,223 | Fleming | Aug. 19, 1952 |
| 2,696,737 | Mittelmann | Dec. 14, 1954 |

OTHER REFERENCES

An Induction Flowmeter Design Suitable for Radioactive Liquids, by W. G. James, The Review of Scientific Instruments.

An Alternating Field Induction Flow Meter of High Sensitivity, A. Kolin, in Review of Scientific Instruments, vol. 16, No. 5, May 1945, pp. 109–116.

An Electromagnetic Blood Flow Meter, Clark and Randall, in Review of Scientific Instruments, vol. 20, No. 12, December 1949, pp. 951–954.